(12) United States Patent
Al-Hannabi et al.

(10) Patent No.: US 11,346,489 B2
(45) Date of Patent: May 31, 2022

(54) PASSIVE ALIGNMENT MECHANISM FOR OFF-CENTERED PROBE DEPLOYMENT

(71) Applicant: Saudi Arabian Oil Company, Dhahran (SA)

(72) Inventors: Abdoulelah Al-Hannabi, Thuwal (SA); Mohamed Abdelkader, Thuwal (SA); Hassane Trigui, Thuwal (SA); Sahejad Patel, Thuwal (SA); Fadi Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 499 days.

(21) Appl. No.: 16/587,752

(22) Filed: Sep. 30, 2019

(65) Prior Publication Data

US 2021/0095810 A1 Apr. 1, 2021

(51) Int. Cl.
*F16L 55/32* (2006.01)
*F16L 55/26* (2006.01)
*F16L 55/48* (2006.01)
*F16L 101/30* (2006.01)

(52) U.S. Cl.
CPC ........... *F16L 55/32* (2013.01); *F16L 2101/30* (2013.01)

(58) Field of Classification Search
CPC ....... F16L 55/32; F16L 2101/30; F16L 55/26; F16L 55/48
See application file for complete search history.

(56) References Cited

U.S. PATENT DOCUMENTS 4,654,702 A 3/1987 Tolino et al.

FOREIGN PATENT DOCUMENTS

| CN | 106896158 | | 6/2017 | |
|---|---|---|---|---|
| CN | 110133097 A | | 8/2019 | |
| EP | 2043906 B1 | * | 3/2011 | ........... B62D 57/028 |

(Continued)

OTHER PUBLICATIONS

Written Opinion of the International Preliminary Examining Authority in corresponding PCT Application No. PCT/US2020/053077 dated May 28, 2021. 6 pages.

(Continued)

*Primary Examiner* — Herbert K Roberts
*Assistant Examiner* — Anthony W Megna Fuentes
(74) *Attorney, Agent, or Firm* — Leason Ellis LLP (57) ABSTRACT

An in-pipe apparatus for pipe inspection or maintenance using a probe or tool includes: a lateral deployment mechanism including a perpendicular deployment mechanism and a linear actuator configured to deploy the perpendicular deployment mechanism in a lateral direction toward a target point to contact an inner wall of the pipe and passively deploy a probe or tool perpendicularly on or at the target point; and a rotational deployment mechanism coupled to the lateral deployment mechanism and including a motor configured to rotationally deploy the lateral deployment mechanism about the inner circumference with respect to a rotation axis that differs from the pipe axis, to align the lateral deployment mechanism in the lateral direction. The perpendicular deployment mechanism includes: a pivot member to pivot the perpendicular deployment mechanism about a pivot axis parallel to the rotation axis; and a probe or tool holder coupled to the pivot member.

19 Claims, 7 Drawing Sheets

(56) References Cited

FOREIGN PATENT DOCUMENTS

| JP | 2001012934 | 1/2001 | |
|---|---|---|---|
| KR | 101494644 B1 * | 2/2015 | .............. F16L 55/32 |
| KR | 101494644 B1 | 2/2015 | |
| KR | 20190052735 A | 5/2019 | |

OTHER PUBLICATIONS

International Search Report and Written Opinion in Corresponding PCT Application No. PCT/US2020/053077 dated Dec. 4, 2020. 11 pages.

* cited by examiner

FIG. 5A $$\Theta_{MAX} = \cos^{-1}\left(\frac{B}{D/2 - \sqrt{W^2 + L^2}}\right) - \tan^{-1}\left(\frac{L}{W}\right)$$

Where:

$\Theta_{MAX}$: Maximum probe holder limited angle for the mechanism to work.

$B$: Vertical offset between the pivot point and the pipe center. This depends on the vehicle dimensions and pipe size.

$D$: Diameter of the pipe.

$W$: Distance between the roller and the center of the probe head.

$L$: Distance between pivot point and the probe head.

PASSIVE ALIGNMENT MECHANISM FOR OFF-CENTERED PROBE DEPLOYMENT

FIELD OF THE DISCLOSURE

The present disclosure relates to pipeline sensing and maintenance in general, and specifically to a pipeline apparatus having a passive alignment mechanism for off-centered in-pipe probe or tool deployment.

BACKGROUND OF THE DISCLOSURE

In automated pipeline technology, in-pipe inspections and maintenance can be challenging tasks as they can require certain functions to be executed in a limited space using remotely operated or autonomous robots and crawlers. Robots and crawlers equipped with sensory features and maintenance tools drive inside the pipe and perform certain tasks at specific locations. It can be important to ensure proper deployment of sensor probes and tool heads (such as perpendicular to the pipe wall) to achieve reliable output. However, to operate inside different pipe sizes and schedules (e.g., different internal diameters), even within the same pipeline, pipeline probe and tool deployers can be off-centered with respect to the pipe axis (center of the pipe). Centering the deployers or otherwise addressing the off-centering can complicate their designs. There can also be navigational obstacles to negotiate, such as weld beads. These and other phenomena can pose further challenges to proper deployment of the probes and tools.

It is in regard to these and other problems in the art that the present disclosure is directed to provide a technical solution for an effective pipeline apparatus having a passive alignment mechanism (or perpendicular deployment mechanism) for off-centered in-pipe probe or tool deployment.

SUMMARY OF THE DISCLOSURE

According to an embodiment, an in-pipe apparatus for pipe inspection or maintenance using a probe or tool is provided. The apparatus includes: a lateral deployment mechanism including a perpendicular deployment mechanism and a linear actuator configured to deploy the perpendicular deployment mechanism in a lateral direction toward a target point on an inner circumference of a pipe in order to contact an inner wall of the pipe and passively deploy the probe or tool perpendicularly on or at the target point; and a rotational deployment mechanism coupled to the lateral deployment mechanism and including a motor configured to rotationally deploy the lateral deployment mechanism about the inner circumference with respect to a rotation axis that differs from the axis of the pipe in order to align the lateral deployment mechanism in the lateral direction. The perpendicular deployment mechanism includes: a pivot member to pivot the perpendicular deployment mechanism about a pivot axis parallel to the rotation axis; and a probe or tool holder coupled to the pivot member and configured to hold the probe or tool while pivoting about the pivot axis using the pivot member. The lateral deployment mechanism further includes an angle limiter configured to limit pivoting of the probe or tool holder to a desired rotation direction about the pivot axis.

In an embodiment, the perpendicular deployment mechanism further includes a spring coupled to the probe or tool holder and configured to absorb force of the lateral deployment on the inner wall.

In an embodiment, the perpendicular deployment mechanism further includes a spring loaded slider including the spring and a roller, the spring loaded slider being configured to slide along a roller guide of the probe or tool holder using the spring, and to contact and roll along the inner wall in alignment with the inner circumference during the lateral deployment using the roller.

In an embodiment: the spring is a first spring, the spring loaded slider is a first spring loaded slider, the roller guide is a first roller guide, and the roller is a first roller; and the perpendicular deployment mechanism further includes a second spring loaded slider including a second spring and a second roller, the second spring loaded slider being configured to slide along a second roller guide of the probe or tool holder using the second spring, the second roller guide being opposite the first roller guide with respect to the pivot axis, and to contact and roll along the inner wall in alignment with the inner circumference during the lateral deployment using the second roller.

In an embodiment: during a first stage of the lateral deployment, neither the first nor second rollers contacts the inner wall while the perpendicular deployment mechanism laterally deploys until one of the first and second rollers contacts the inner wall and the other of the first and second rollers does not contact the inner wall; during a second stage of the lateral deployment, the probe or tool holder pivots about the pivot axis in the desired rotation direction using the pivot member while the one of the first and second rollers maintains contact with the inner wall and the other of the first and second rollers does not contact the inner wall until both the first and second rollers contact the inner wall; and during a third stage of the lateral deployment, the first and second rollers maintain contact with the inner wall and the probe or tool does not contact the target point while the first and second springs absorb force of the lateral deployment on the inner wall until the probe or tool contacts the target point or a desired air gap is reached between the probe or tool and the target point.

In an embodiment, the spring loaded slider is further configured to contact and roll along the inner wall in alignment with the inner circumference during the rotational deployment using the roller.

In an embodiment, the apparatus further includes a longitudinal deployment mechanism coupled to the rotational deployment mechanism and configured to longitudinally deploy the rotational deployment mechanism in a longitudinal direction along the pipe axis, to align the rotational deployment mechanism with the inner circumference.

In an embodiment: the longitudinal deployment mechanism includes wheels; an internal diameter of the pipe varies in the longitudinal direction; and the perpendicular deployment mechanism is further configured to passively deploy the probe or tool perpendicularly on each of a plurality of target points during the longitudinal deployment, each target point being on a different inner circumference having a different internal diameter of the pipe.

In an embodiment: the target point includes a plurality of target points on the inner circumference at a corresponding plurality of lateral directions with respect to the rotation axis; and the motor of the rotational deployment mechanism is further configured for each target point to rotationally deploy the lateral deployment mechanism to align the lateral deployment mechanism in the corresponding lateral direction.

In an embodiment, the lateral deployment mechanism further includes: a lateral slider coupled to the probe or tool holder using the pivot member; and a linear guide configured to linearly guide the lateral slider in the lateral direction using the linear actuator, to laterally deploy the perpendicular deployment mechanism in the lateral direction; wherein the angler limiter is further configured to couple the probe or tool holder to the lateral slider at a limiting angle of the pivoting.

According to another embodiment, a method of in-pipe inspection or maintenance using a probe or tool is provided. The method includes: automatically rotationally deploying the probe or tool about an inner circumference of a pipe with respect to a rotation axis that differs from the axis of the pipe; laterally deploying, using a lateral deployment mechanism, the probe or tool in a lateral direction from the rotation axis toward a target point on the inner circumference; and passively deploying the probe or tool perpendicularly on or at the target point during the lateral deployment. Passively deploying includes: holding the probe or tool in a probe or tool holder while pivoting the probe or tool holder about a pivot axis parallel to the rotation axis; absorbing force of the lateral deployment on an inner wall of the pipe using a spring; and limiting pivoting of the probe or tool holder to a desired rotation direction about the pivot axis using an angle limiter.

In an embodiment, the method further includes automatically longitudinally deploying the probe or tool in a longitudinal direction along the pipe axis.

In an embodiment: longitudinally deploying includes using wheels; an internal diameter of the pipe varies in the longitudinal direction; and perpendicularly deploying further includes passively deploying the probe or tool perpendicularly on or at each of a plurality of target points during the longitudinal deployment, each target point being at a different longitudinal position having a different internal diameter of the pipe.

In an embodiment, rotationally deploying includes rotating the lateral deployment mechanism about the rotation axis using a motor.

In an embodiment: the target point includes a plurality of target points on the inner circumference of the pipe at a corresponding plurality of lateral directions from the rotation axis; and rotationally deploying further includes rotationally deploying the probe or tool to each of the lateral directions while laterally deploying the probe or tool toward a corresponding one of the target points and passively deploying the probe or tool perpendicularly on or at the corresponding one of the target points.

In an embodiment, perpendicularly deploying further includes sliding a spring loaded slider along a roller guide of the probe or tool holder using the spring and contacting and rolling the spring loaded slider along the inner wall in alignment with the inner circumference during the lateral deployment using a roller.

In an embodiment: the spring is a first spring, the spring loaded slider is a first spring loaded slider, the roller guide is a first roller guide of the probe or tool holder, and the roller is a first roller; and perpendicularly deploying further includes sliding a second spring loaded slider along a second roller guide of the probe or tool holder using a second spring, the second roller guide being opposite the first roller guide with respect to the pivot axis, and contacting and rolling the second spring loaded slider along the inner wall in alignment with the inner circumference during the lateral deployment using a second roller.

In an embodiment: during a first stage of the lateral deployment, neither the first nor second rollers contacts the inner wall while the probe or tool laterally deploys until one of the first and second rollers contacts the inner wall and another of the first and second rollers does not contact the inner wall; during a second stage of the lateral deployment, the probe or tool holder pivots about the pivot axis in the desired rotation direction while the one of the first and second rollers maintains contact with the inner wall and the other of the first and second rollers does not contact the inner wall until both the first and second rollers contact the inner wall; and during a third stage of the lateral deployment, the first and second rollers maintain contact with the inner wall and the probe or tool does not contact the inner wall while the first and second springs absorb the force of the lateral deployment on the inner wall until the probe or tool contacts the inner circumference or a desired air gap is reached between the probe or tool and the inner circumference.

In an embodiment, the method further includes contacting and rolling the spring loaded slider along the inner wall in alignment with the inner circumference during the rotational deployment using the roller.

In an embodiment, laterally deploying includes: coupling the probe or tool holder to a lateral slider on the pivot axis; linearly guiding the lateral slider in the lateral direction using a linear guide; linearly actuating the lateral slider along the linear guide, to laterally deploy the probe or tool in the lateral direction; and coupling the probe or tool holder to the lateral slider at a limiting angle of the pivoting using the angle limiter.

Any combinations of the various embodiments and implementations disclosed herein can be used. These and other aspects and features can be appreciated from the following description of certain embodiments along with the accompanying drawings and claims.

It is noted that the drawings are illustrative and not necessarily to scale.

DETAILED DESCRIPTION OF CERTAIN EMBODIMENTS OF THE DISCLOSURE

Example embodiments of the present disclosure are directed to an automated pipeline apparatus having a passive alignment mechanism (or perpendicular deployment mechanism) for off-centered in-pipe probe or tool deployment. In some such embodiments, a simple and efficient mechanism to deploy a probe or tool properly (e.g., perpendicularly) in a pipe (such as a small diameter pipe) and without centering with respect to the pipe axis is provided. The pipeline apparatus includes a rotational deployment mechanism, such as a servo motor, to rotate a lateral deployment mechanism about an axis of rotation to an appropriate angular position with respect to the inner circumference of the pipe. The lateral deployment mechanism is for laterally deploying the probe or tool (e.g., to or on the inner circumference at the desired rotational angle). Together, the rotational and lateral deployment mechanisms rotate a probe or tool to the appropriate (target) location on the pipe inner wall, and laterally deploy the probe or tool to the desired location. To this end, in one example such embodiment, the lateral deployment mechanism includes a linear actuator together with a linear guide and a slider mechanism.

The passive alignment mechanism (also referred to as a perpendicular deployment mechanism) includes a holder that attaches the probe or tool to the end of the slider. The probe or tool holder has a pivot point (or more precisely, a pivot axis parallel to the rotation axis) at the end of the slider to pivot the probe or tool after engagement of the passive alignment mechanism with the pipe inner wall. The passive alignment mechanism also includes an angle limiter to limit the pivoting angle of the tool or probe. Additionally, the passive alignment mechanism includes two spring loaded rollers or wheels (also called spring loaded sliders) coupled to the probe or tool holder to make sure that probe or tool is deployed perpendicularly (e.g., by letting one roller engage and roll along the pipe inner wall while the other roller moves into position to engage the pipe inner wall). When both rollers engage the pipe inner wall, the probe or tool is perpendicular to the wall. The rollers or wheels also permit continuous circumferential movement of the passive alignment mechanism along the inner circumference (e.g., using the rotational deployment mechanism) once deployed on the inner wall. The probe or tool holder is centered with respect to the spring loaded rollers, which can be pressed (and whose springs absorb the deploying force and maintain alignment of the probe or tool) on the inner wall to account for various inner curvatures (different pipe schedules and sizes).

As discussed earlier, in-pipe inspection and maintenance can be a rigorous task as it can require certain functions to be executed in a limited space using remotely operated or autonomous robots or crawlers. Compounding these challenges includes the need for proper deployment of the probes and tool heads to achieve desired output. Other ways of addressing these concerns can rely on manual or automated centering mechanisms, such as attaching the probe or tool to a motor to account for rotation and pneumatically actuating the probe or tool to laterally deploy and take readings in the desired locations. These approaches can lack automation or require centering, which increases the number of components and the complexity to the robotic system or crawler to account for this function.

Accordingly, in an example embodiment, a pipeline apparatus having a passive alignment mechanism (or perpendicular deployment mechanism) for off-centered in-pipe probe or tool deployment is provided. The passive alignment mechanism uses a probe or tool holder with a degree of freedom (e.g., a pivot point or, more precisely, a pivot axis parallel to the rotation axis of the rotational deployment mechanism) to passively align the probe or tool to an inside surface of the pipe and without requiring centering of the probe or tool deployer with respect to the pipe axis. The passive alignment mechanism includes an angle limiter to limit the pivoting of the probe or tool holder to ensure proper deployment on the inner circumference of the pipe. The passive alignment mechanism includes spring loaded rollers or wheels to ensure desired pressure on the pipe sidewall for proper (e.g., perpendicular) probe or tool deployment. The spring loaded rollers or wheels also permit continuous rotational movement of the probe or tool holder even after engagement of the passive alignment mechanism and the inner wall of the pipe.

In addition, the spring loaded rollers or wheels allow the passive alignment mechanism to account for different curvatures (e.g., pipe schedules) in the same or different pipelines with which the pipeline apparatus is deployed. For example, one roller can engage and roll along the inner wall of the pipe while the other roller rotates into position before it engages the wall. Furthermore, the springs in the rollers absorb the pressing (deploying) force to maintain perpendicular alignment of the probe or tool with respect to the pipe inner wall while the probe or tool moves to and contacts the inner wall during deployment. In some embodiments, the perpendicular deployment of the probe or tool stops short of contacting the inner wall, to leave an air gap between the probe or tool and the inner wall. Some probes or tools (such as distance sensor probes) are designed to deploy perpendicularly to the inner wall, but not contact the inner wall, leaving the air gap. In some such embodiments, the perpendicular deployment stops at or after some desired or pre-specified limit (e.g., air gap distance, lateral deployment force limit) is reached, such as with the help of the springs in the spring loaded rollers. This can leave the probe or tool at a desired offset (air gap) from the inner wall, or have it contacting the inner wall but with a desired force against the wall.

Throughout, a dry film thickness (DFT) probe is used and illustrated as an example probe or tool for use with some embodiments. Such a digital coating thickness gauge can use magnetic and eddy current principles to measure the coating thickness on ferrous and non-ferrous metals using a probe. However, this probe should be deployed perpendicularly on the surface of interest to take a reliable measurement, as even small deviations from perpendicular can cause unreliable measurements. While the DFT probe is used throughout for convenience of description, other embodiments are not so limited. For example, in some embodiments, other probes (such as an ultrasonic thickness probe) or tools serve as example probes or tools for passive alignment for off-centered in-pipe probe or tool deployment. Such pipeline apparatuses are able to take reliable readings (or reliably deploy tools) in different pipe schedules, even when the probe or tool deployer is off-centered with respect to the pipe axis. The passive alignment mechanism works seamlessly when changing pipe schedules or sizes, either between pipelines or within the same pipeline.

In an embodiment, a simple and efficient technique to deploy a probe or tool properly and without having to center any rotational deployer within the pipe is provided. The technique reduces the complexity compared to comparable approaches. The technique includes a rotational deployment mechanism (e.g., a servo motor) to actuate the probe or tool in the circumferential angular dimension and rotate the probe or tool around the circumference of the inner pipe. The technique further includes a lateral deployment mechanism to laterally deploy the probe or tool on or near the inside surface of the pipe. The lateral deployment mechanism includes a linear actuator to linearly deploy the probe or tool using a linear guide and a slider. The slider includes a passive alignment mechanism (also referred to as a perpendicular deployment mechanism) at the end of the slider to attach and hold the probe or tool while permitting pivoting of the probe or tool holder. The passive alignment mechanism includes a limiter for limiting the probe holder degree of freedom (e.g., amount of pivoting).

Additionally, the passive alignment mechanism includes two spring loaded rollers (also referred to as spring loaded sliders) with the probe or tool holder coupled therebetween to ensure perpendicular probe or tool deployment. The spring loaded rollers allow the probe or tool to be pressed on the pipe sidewall, absorbing the deployment force of the lateral deployment while maintaining perpendicular alignment of the probe or tool with the sidewall. The spring loaded rollers further allow proper probe or tool deployment for various inner curvatures (different pipe schedules and sizes).

Figure 1:
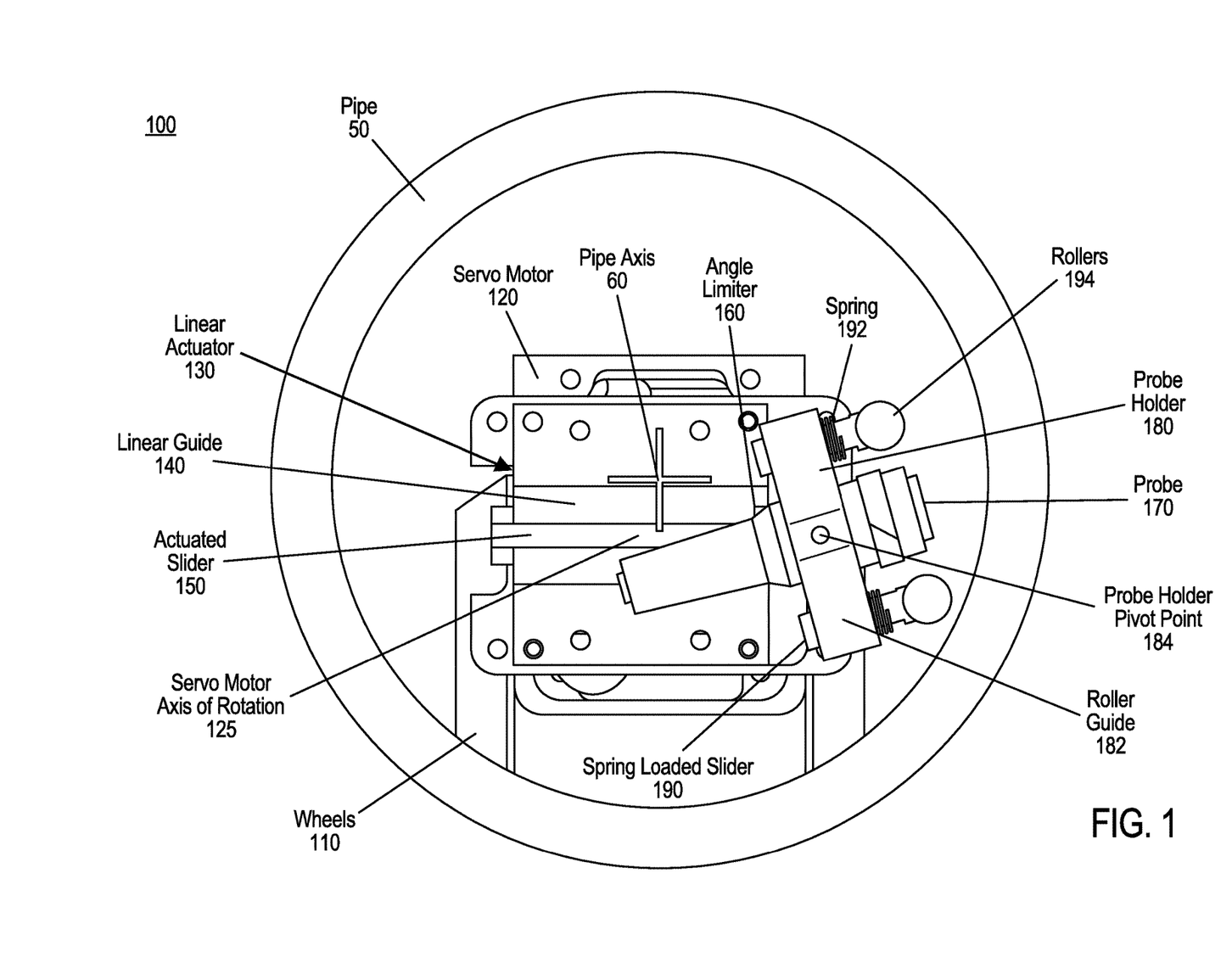
FIGS. 1-2 are front views of an example pipeline apparatus having a passive alignment mechanism for off-centered in-pipe probe or tool deployment, shown in engagement and deployment positions, respectively, within a pipe, according to an embodiment.
Figure 2:
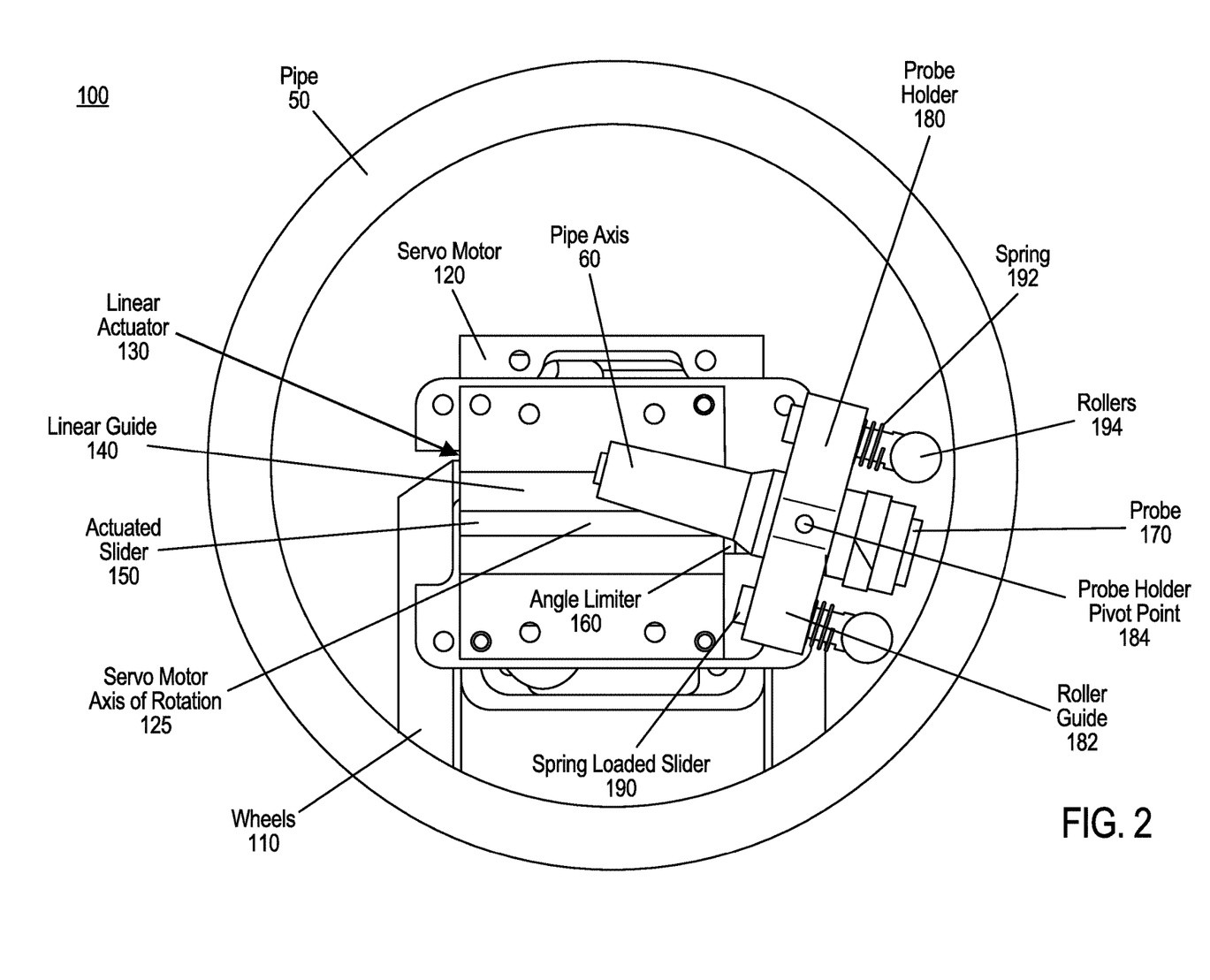
Figure 3:
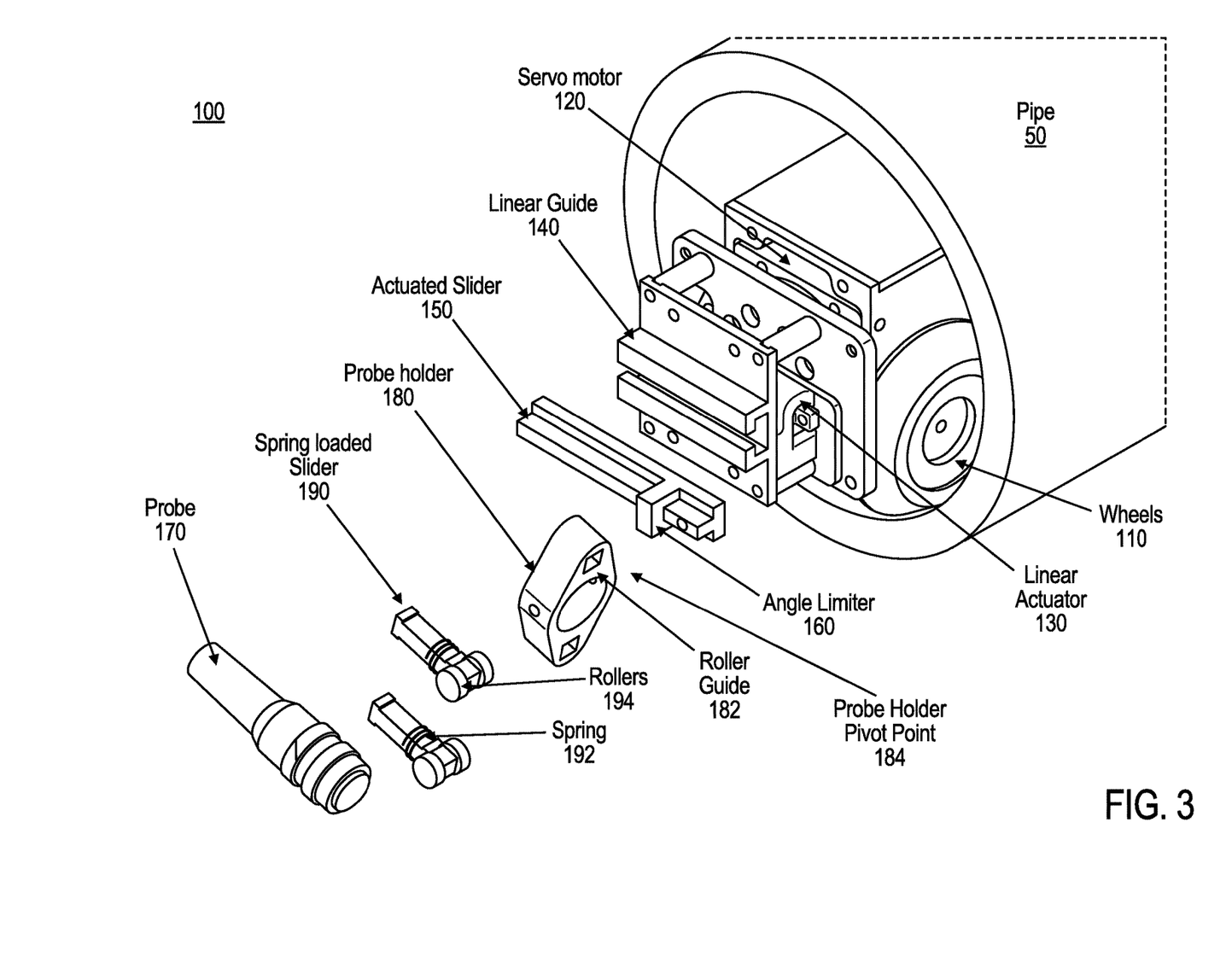
FIG. 3 is an exploded view of the pipeline apparatus of FIGS. 1-2.
Figure 4A:
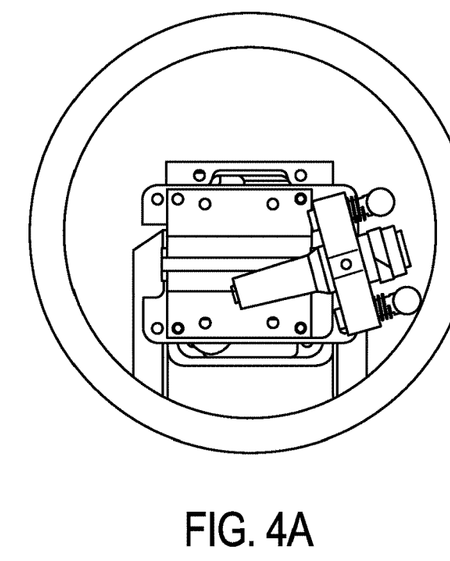
FIGS. 4A-4C are front views of an example deployment of the pipeline apparatus of FIGS. 1-3, according to an embodiment.
Figure 4B:
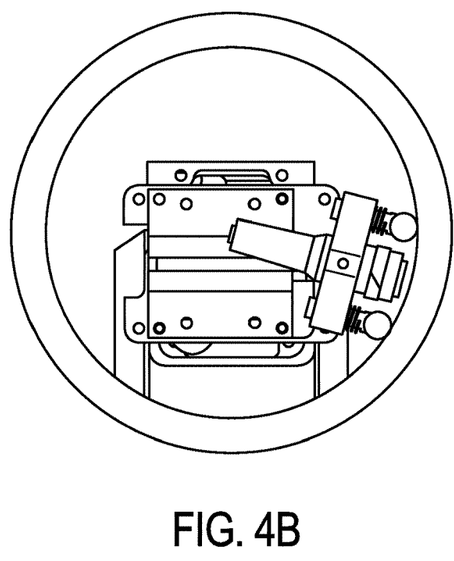
Figure 4C:
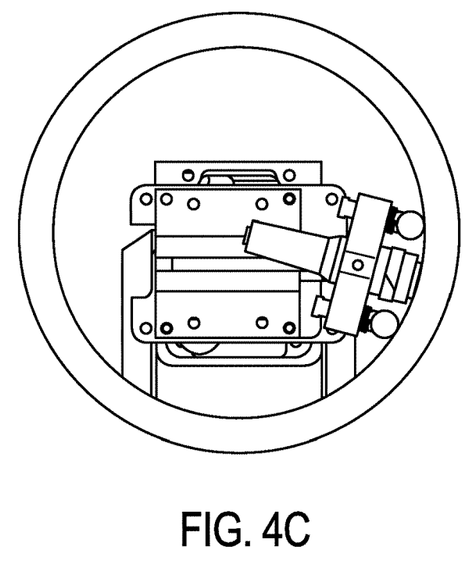

FIGS. 1-2 are front views of an example pipeline apparatus 100 having a passive alignment mechanism (or perpendicular deployment mechanism) for off-centered in-pipe probe or tool deployment, shown in engagement and deployment positions, respectively, within a pipe 50, according to an embodiment. FIG. 3 is an exploded view of the pipeline apparatus 100 of FIGS. 1-2. FIGS. 4A-4C are front views of an example deployment of the pipeline apparatus 100 of FIGS. 1-3, according to an embodiment.

FIG. 1 illustrates the pipeline apparatus 100 about to engage the inner wall of the pipe 50, while FIG. 2 illustrates the pipeline apparatus 100 about to deploy a probe 170 on the inner wall of the pipe 50. FIG. 3 illustrates the components of the pipeline apparatus 100 in exploded form from a different perspective. FIGS. 4A-4C illustrate the pipeline apparatus 100 during three stages of deployment of the probe 170 on (and different extensions of the passive alignment mechanism towards) the inner wall of the pipe 50. FIG. 4A illustrates the pipeline apparatus 100 just at the point of the passive alignment mechanism engaging the inner wall of the pipe 50, with the probe 170 being separated from and not pointing perpendicular to the inner wall. FIG. 4B illustrates the pipeline apparatus 100 just at the point both spring loaded sliders 190 of the passive alignment mechanism engage the inner wall of the pipe 50, with the probe 170 being perpendicular to (but still separated from) the inner wall. FIG. 4C illustrates the pipeline apparatus 100 just at the point that the probe 170 engages the inner wall of the pipe 50, with the springs of the spring loaded sliders 190 absorbing enough of the extension of the passive alignment mechanism that the probe 190 perpendicularly engages the inner wall.

In further detail, the pipeline apparatus 100 includes a longitudinal deployment mechanism (including wheels 110 and a motor) for deploying the probe 170 longitudinally along pipe axis 60, including navigating obstacles such as weld beads and negotiating different pipe schedules that are part of the same pipeline. As such, an internal diameter of the pipe 50 can vary in the longitudinal direction. However, the pipeline apparatus 100 is configured to deploy the probe 170 perpendicularly on the inner wall for a range of inside pipe diameters. The pipeline apparatus 100 further includes a rotational deployment mechanism, such as a servo motor 120 having an axis of rotation 125 offset from the pipe axis 60. The servo motor is for rotationally deploying the probe 170 about the circumference of the inner sidewall of the pipe 50.

Every location on the inner wall of the pipe 50 corresponds to a longitudinal location and a rotational location about the axis of rotation 125. Given a sufficiently long lateral deployment mechanism, the pipeline apparatus 100 can deploy the probe 170 to any target point on the inside of the pipe 50 using the longitudinal, rotational, and lateral deployment mechanisms. The pipeline apparatus 100 can also deploy the probe 170 discretely, such as to numerous different target points on the inner circumference (e.g., one after another), or continuously, such as to a target region on the inner circumference (e.g., using the rollers while not changing the perpendicular deployment of the probe 170).

The lateral deployment mechanism of the pipeline apparatus 100 includes a linear actuator 130 for linearly actuating an actuated slider 150 (or lateral slider) along a linear guide 140. At one end of the actuated slider 150 (e.g., the deployment end), there is a passive alignment mechanism for passively aligning the probe 170 perpendicularly against the inner wall of the pipe 50.

In accordance with a salient aspect of the invention, the passive alignment mechanism (or perpendicular deployment mechanism) includes an angle limiter 160 for limiting a pivot angle of a probe holder 180 that securely holds the probe 170 for deployment on the inner wall of the pipe 50. The angle limiter 160 prevents the passive alignment mechanism from pivoting in the wrong direction (e.g., clockwise or counterclockwise, depending on the orientation of the passive alignment mechanism with respect to the inner wall of the pipe 50). The probe holder 180 is attached to the deployment end of the actuated slider 150 at a pivot point 184 (or pivot axis), and pivots about the pivot axis in the sliding (length) direction of the actuated slider 150 as limited by the angle limiter 160. While the angle limiter 160 is illustrated as being part of the actuated slider 150, the disclosure is not limited thereto, and in other embodiments, the angle limiter can be located elsewhere, such as part of the probe holder 180, or part of both the actuated slider 150 and the probe holder 180, or between the actuated slider 150 and the probe holder 180 (e.g., configured to couple the actuated slider 150 to the probe holder 180 at the limiting angle of the angle limiter 160).

In another important feature, the passive alignment mechanism further includes the probe holder 180 for securing the probe 170 while allowing the probe to pivot about the probe holder pivot point 184. The passive alignment mechanism also includes two spring loaded sliders 190 (also called spring loaded rollers) for deploying the probe 170 on the sidewall of the pipe 50 (e.g., one slider 190 on each side of the probe 170 in the circumferential direction of the inner pipe). The probe holder 180 further includes two roller guides 182, one at each (rotational) end of the probe holder 180, for holding the spring loaded sliders 190. Each spring loaded slider 190 includes a spring 192 for absorbing deployment force as the actuated slider 150 is moved towards a target point on the inner wall of the pipe 50. Each slider 190 further includes one or more rollers 194 (or wheels) for allowing the passive alignment mechanism to follow the inner circumference of the pipe 50 until both sliders 190 engage the inner circumference. The rollers 194 also allow continuous deployment of the passive alignment mechanism while the rotational deployment mechanism rotates the lateral deployment mechanism.

The servo motor 120 rotates the lateral deployment mechanism to take measurements at various degrees or angles (or even continuously) around the inner circumference of the pipe 50. For example, after the servo motor 120 stops at a certain angle (such as a desired or predetermined angle), the linear actuator 130 transfers (or otherwise linearly actuates) the slider 150 closer to the inner surface of the pipe 50, as shown in FIG. 4A. As the actuated slider 150 moves closer to the inner surface, both rollers 194 engage the inner surface to ensure perpendicularity of the probe 170 to the inner surface, as seen in FIG. 4B. As a result, when the actuated slider 150 moves even further, the probe 170 deploys (as illustrated in FIG. 4C), where the springs 192 on the roller sliders 190 compress (e.g., for compression springs) to account for curvature variations in different pipe schedules or inside diameters. In other embodiments, different types of springs (such as tension springs) are used in place of (or in addition to) compression springs.

Figure 5A:
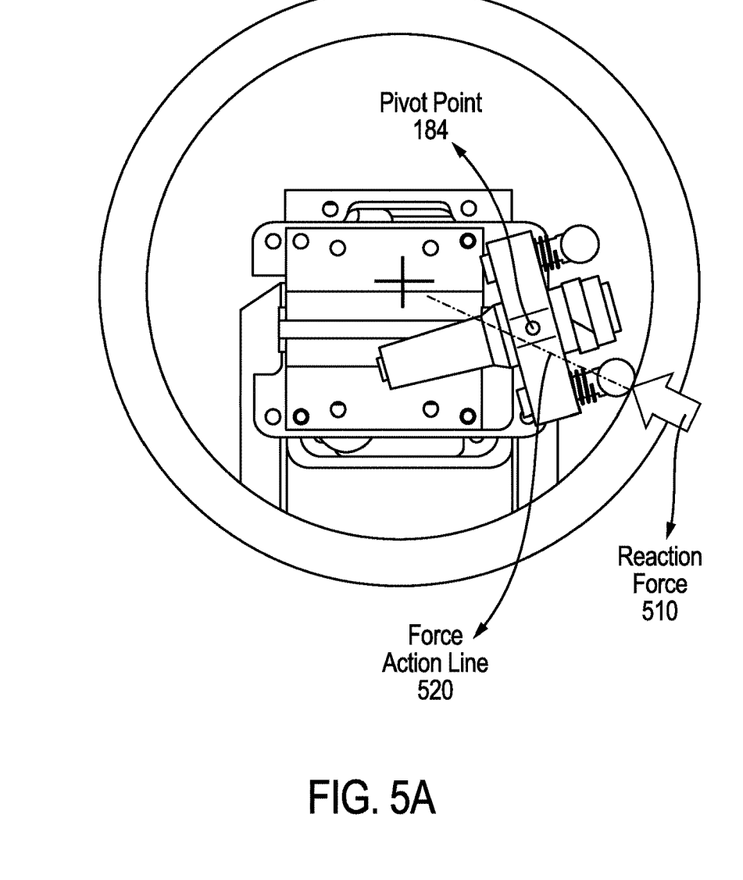
FIGS. 5A-5B are front views of the pipeline apparatus of FIGS. 1-4C, showing an example off-centered engagement position of the passive alignment mechanism and the geometry for demonstrating criticality of a probe holder limiter and mechanism design consideration, according to an embodiment.
Figure 5B:
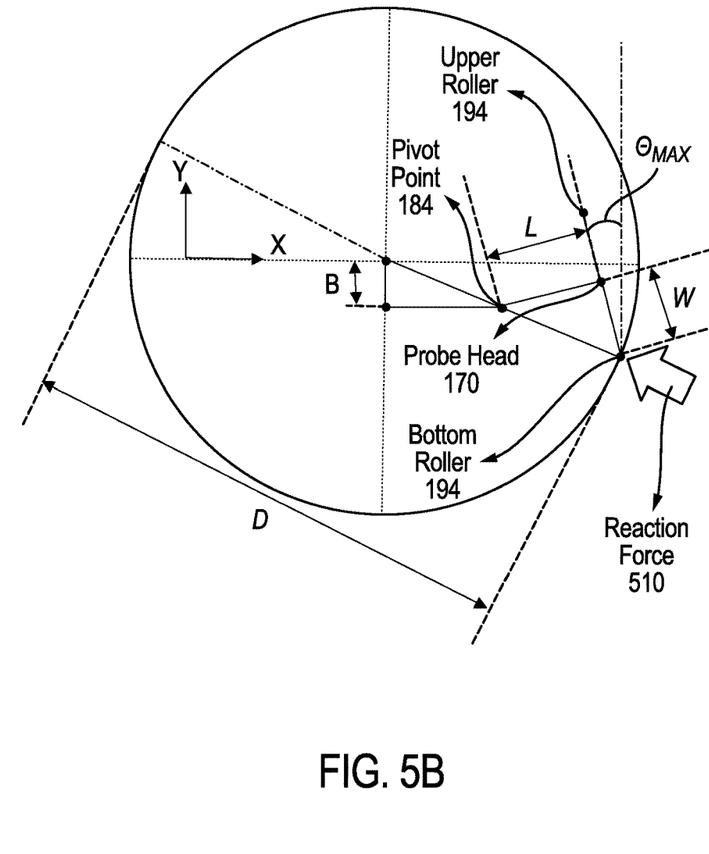
Figure 6:
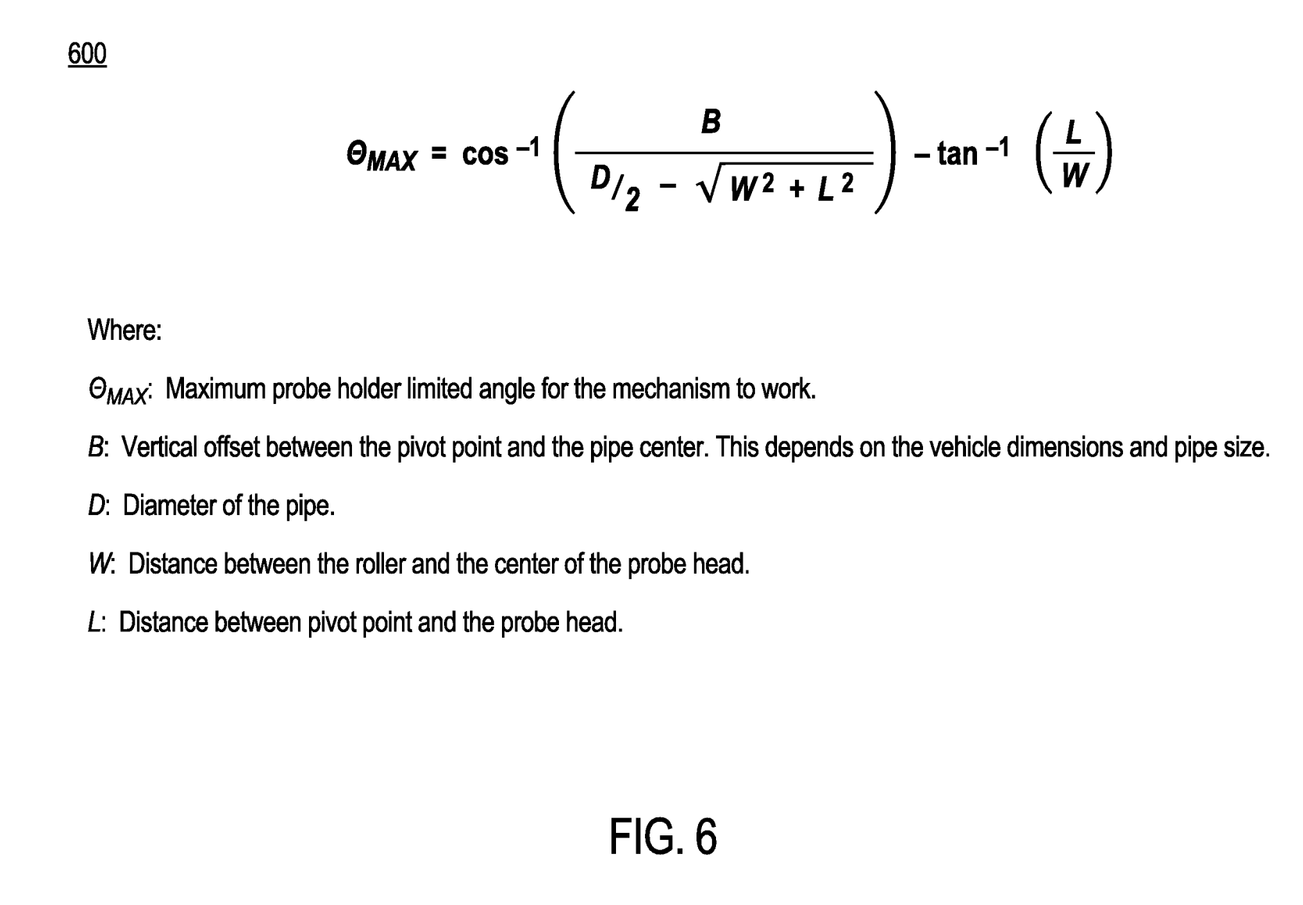
FIG. 6 is a corresponding equation demonstrating the criticality of the probe holder angle limiter and mechanism design consideration of the pipeline apparatus of FIGS. 1-5B.

FIGS. 5A-5B are front views of the pipeline apparatus of FIGS. 1-4C, showing an example off-centered engagement position of the passive alignment mechanism and the geometry for demonstrating criticality of the probe holder angle limiter 160 and mechanism design consideration, according to an embodiment. FIG. 6 is a corresponding equation 600 demonstrating the criticality of the probe holder angle limiter 160 and mechanism design consideration of the pipeline apparatus 100 of FIGS. 1-5B.

For the passive alignment mechanism to work properly, the angle of the probe holder 180 about its pivot axis should be constrained within a certain range. By looking at FIG. 5A, when the roller 194 touches the pipe 50, the holder 180 could passively rotate either clockwise (which is the intended direction in this case) or counter-clockwise (which is undesired). This is governed by factors such as the torque applied by the reaction force 510 around the pivot point 184 (or pivot axis). By analyzing the action line 520 of the force 510 and its location with respect to the pivot point 184, the resulting rotational motion can be determined. If the reaction line 520 is below the pivot point 184 (as in FIG. 5A), the reaction force 510 rotates the probe holder 180 clockwise (the desired direction in FIG. 5A). On the other hand, if the reaction line 520 is above the pivot point 184, the mechanism rotates counterclockwise (which defeats the purpose of the mechanism in this case).

With reference to FIGS. 5B-6, the maximum angle $\theta_{MAX}$ that the probe 170 can have and avoid the unintended rotation depends on many factors including how offset the axis of rotation 125 (of the rotational deployment mechanism, e.g., servo motor 120) is from the axis of the pipe 50, the diameter of the pipe 50, the distance from the roller 194 to the center line (or plane) of the probe 50, and the distance from the pivot point 184 to the probe head 170. The limited angle of the probe holder 180 plays a major part to make sure that the reaction line 520 is limited and always kept behind the pivot point 184 to get the desired direction of rotation once the roller 194 presses the inside surface of the pipe 50. The maximum limited angle $\theta_{MAX}$ can be found as shown in FIG. 6, where the angle limiter 160 should limit this angle before it reaches $\theta_{MAX}$.

Figure 7:
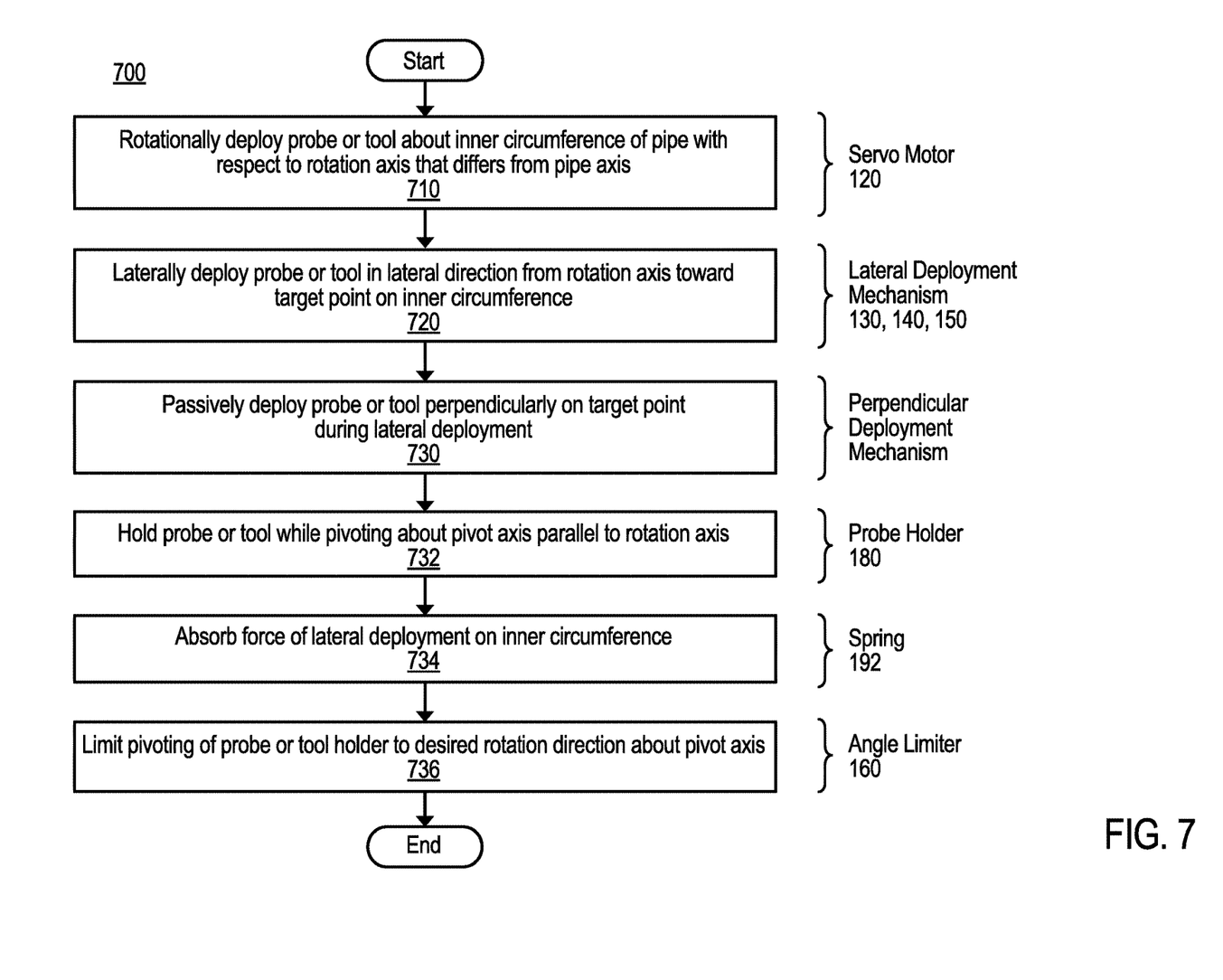
FIG. 7 is a flow chart of an example method of in-pipe inspection or maintenance of a pipe, such as for use by the pipeline apparatus of FIGS. 1-6, according to an embodiment.

FIG. 7 is a flow chart of an example method 700 of in-pipe inspection or maintenance of a pipe, such as for use by the pipeline apparatus 100 of FIGS. 1-6, according to an embodiment.

Some or all of the method 700 can be performed using components and techniques illustrated in FIGS. 1-6. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 700 (or other disclosed method) to be carried out. It should be noted that in other embodiments, the order of the operations can be varied, and that some of the operations can be omitted.

In the example method 700, processing begins with automatically rotationally deploying 710 (such as with a rotational deployment mechanism, like servo motor 120) a probe or tool (such as probe 170, as in a DFT probe) about an inner circumference of the pipe (such as pipe 50) with respect to a rotation axis (such as axis of rotation 125) that differs from the axis of the pipe (such as pipe axis 60). The method 700 further includes laterally deploying 720, using a lateral deployment mechanism (such as linear actuator 130, linear guide 140, and actuated slider 150), the probe or tool in a lateral direction (such as towards the inner circumference) from the rotation axis toward a target point (such as at 3 o'clock or 9 o'clock positions) on the inner circumference. The method 700 also includes passively deploying 730 (such as with a passive alignment mechanism or perpendicular deployment mechanism) the probe or tool perpendicularly on the target point during the lateral deployment.

In further detail, the perpendicular deployment 730 includes holding 732 the probe or tool in a probe or tool holder (such as probe holder 180) while pivoting the probe or tool holder about a pivot axis (such as pivot point 184) parallel to the rotation axis. In addition, the perpendicular deployment 730 includes absorbing 734 force of the lateral deployment (such as lateral force from the linear actuator 130) on the inner circumference using a spring (such as spring 192). The perpendicular deployment 730 also includes limiting 736 pivoting of the probe or tool holder to a desired rotation direction (such as clockwise or counterclockwise) about the pivot axis using an angle limiter (such as angle limiter 160).

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. An in-pipe apparatus for pipe inspection or maintenance in a pipe using a probe, the apparatus comprising:
   a lateral deployment mechanism comprising
   a lateral slider;
   a perpendicular deployment mechanism coupled to the probe, and coupled to the lateral slider at a deployment end of the lateral slider; and
   a linear actuator configured to laterally deploy the lateral slider, the perpendicular deployment mechanism, and the probe in a lateral direction from a rotation axis that differs from the axis of the pipe toward a target point on an inner circumference of the pipe in order for the perpendicular deployment mechanism to contact an inner wall of the pipe and passively deploy the probe perpendicularly on or at the target point; and
   a rotational deployment mechanism coupled to the lateral deployment mechanism and comprising a motor configured to automatically rotationally deploy the lateral deployment mechanism and the probe about the inner circumference of the pipe with respect to the rotation axis in order to align the lateral deployment mechanism in the lateral direction,
   wherein the perpendicular deployment mechanism comprises:
   a pivot member configured to pivot the perpendicular deployment mechanism and the probe about a pivot axis parallel to the rotation axis after engagement of the laterally deploying perpendicular deployment mechanism with the inner wall;
   a probe holder coupled to the deployment end of the lateral slider using the pivot member, and configured to hold the probe while pivoting about the pivot axis using the pivot member in order to passively align the probe to the inner wall and without requiring centering of the lateral slider with respect to the pipe axis; and
   a spring coupled to the probe holder and configured to absorb force of the lateral deployment of the perpendicular deployment mechanism on the inner wall, and wherein the lateral deployment mechanism further comprises an angle limiter configured to limit the pivoting of the probe holder to a desired rotation direction about the pivot axis.

2. The apparatus of claim 1, wherein the perpendicular deployment mechanism further comprises a spring loaded slider including the spring and a roller, the spring loaded slider being configured to slide along a roller guide of the probe holder using the spring, and to contact and roll along the inner wall in alignment with the inner circumference during the lateral deployment using the roller.

3. The apparatus of claim 2, wherein: the spring is a first spring, the spring loaded slider is a first spring loaded slider, the roller guide is a first roller guide, and the roller is a first roller; and the perpendicular deployment mechanism further comprises a second spring loaded slider including a second spring and a second roller, the second spring loaded slider being configured to slide along a second roller guide of the probe holder using the second spring, the second roller guide being opposite the first roller guide with respect to the pivot axis, and to contact and roll along the inner wall in alignment with the inner circumference during the lateral deployment using the second roller.

4. The apparatus of claim 3, wherein: during a first stage of the lateral deployment, neither the first nor second rollers contacts the inner wall while the perpendicular deployment mechanism laterally deploys until one of the first and second rollers contacts the inner wall and the other of the first and second rollers does not contact the inner wall; during a second stage of the lateral deployment, the probe holder pivots about the pivot axis in the desired rotation direction using the pivot member while the one of the first and second rollers maintains contact with the inner wall and the other of the first and second rollers does not contact the inner wall until both the first and second rollers contact the inner wall; and during a third stage of the lateral deployment, the first and second rollers maintain contact with the inner wall and the probe does not contact the target point while the first and second springs absorb force of the lateral deployment on the inner wall until the probe contacts the target point or a desired air gap is reached between the probe and the target point.

5. The apparatus of claim 2, wherein the spring loaded slider is further configured to contact and roll along the inner wall in alignment with the inner circumference during the rotational deployment using the roller.

6. The apparatus of claim 1, further comprising a longitudinal deployment mechanism coupled to the rotational deployment mechanism and configured to longitudinally deploy the rotational deployment mechanism in a longitudinal direction along the pipe axis, to align the rotational deployment mechanism with the inner circumference.

7. The apparatus of claim 6, wherein: the longitudinal deployment mechanism comprises wheels; an internal diameter of the pipe varies in the longitudinal direction; and the perpendicular deployment mechanism is further configured to passively deploy the probe perpendicularly on each of a plurality of target points during the longitudinal deployment, each target point being on a different inner circumference having a different internal diameter of the pipe.

8. The apparatus of claim 1, wherein:
the target point comprises a plurality of target points on the inner circumference at a corresponding plurality of lateral directions with respect to the rotation axis; and
the motor of the rotational deployment mechanism is further configured for each target point to rotationally deploy the lateral deployment mechanism to align the lateral deployment mechanism in the corresponding lateral direction.

9. The apparatus of claim 1, wherein the lateral deployment mechanism further comprises: a linear guide configured to linearly guide the lateral slider in the lateral direction using the linear actuator, to laterally deploy the perpendicular deployment mechanism in the lateral direction; wherein the angler limiter is further configured to couple the probe holder to the lateral slider at a limiting angle of the pivoting.

10. A method of in-pipe inspection or maintenance using a probe, the method comprising:
automatically rotationally deploying the probe about an inner circumference of a pipe with respect to a rotation axis that differs from the axis of the pipe;
laterally deploying, using a lateral deployment mechanism, the probe in a lateral direction from the rotation axis toward a target point on the inner circumference; and
passively deploying the probe perpendicularly on or at the target point during the lateral deployment, comprising:
holding the probe in a probe holder while pivoting the probe holder about a pivot axis parallel to the rotation axis;
absorbing force of the lateral deployment on an inner wall of the pipe using a spring; and
limiting pivoting of the probe holder to a desired rotation direction about the pivot axis using an angle limiter.

11. The method of claim 10, further comprising automatically longitudinally deploying the probe in a longitudinal direction along the pipe axis.

12. The method of claim 11, wherein: longitudinally deploying comprises using wheels; an internal diameter of the pipe varies in the longitudinal direction; and perpendicularly deploying further comprises passively deploying the probe perpendicularly on or at each of a plurality of target points during the longitudinal deployment, each target point being at a different longitudinal position having a different internal diameter of the pipe.

13. The method of claim 10, wherein rotationally deploying comprises rotating the lateral deployment mechanism about the rotation axis using a motor.

14. The method of claim 13, wherein: the target point comprises a plurality of target points on the inner circumference of the pipe at a corresponding plurality of lateral directions from the rotation axis; and rotationally deploying further comprises rotationally deploying the probe to each of the lateral directions while laterally deploying the probe toward a corresponding one of the target points and passively deploying the probe perpendicularly on or at the corresponding one of the target points.

15. The method of claim 10, wherein perpendicularly deploying further comprises sliding a spring loaded slider along a roller guide of the probe holder using the spring and contacting and rolling the spring loaded slider along the inner wall in alignment with the inner circumference during the lateral deployment using a roller.

16. The method of claim 15, wherein: the spring is a first spring, the spring loaded slider is a first spring loaded slider, the roller guide is a first roller guide of the probe holder, and the roller is a first roller; and perpendicularly deploying further comprises sliding a second spring loaded slider along a second roller guide of the probe holder using a second spring, the second roller guide being opposite the first roller guide with respect to the pivot axis, and contacting and rolling the second spring loaded slider along the inner wall in alignment with the inner circumference during the lateral deployment using a second roller.

17. The method of claim 16, wherein: during a first stage of the lateral deployment, neither the first nor second rollers contacts the inner wall while the probe laterally deploys until one of the first and second rollers contacts the inner wall and another of the first and second rollers does not contact the inner wall; during a second stage of the lateral deployment, the probe holder pivots about the pivot axis in the desired rotation direction while the one of the first and second rollers maintains contact with the inner wall and the other of the first and second rollers does not contact the inner wall until both the first and second rollers contact the inner wall; and during a third stage of the lateral deployment, the first and second rollers maintain contact with the inner wall and the probe does not contact the inner wall while the first and second springs absorb the force of the lateral deployment on the inner wall until the probe contacts the inner circumference or a desired air gap is reached between the probe and the inner circumference.

18. The method of claim 15, further comprising contacting and rolling the spring loaded slider along the inner wall in alignment with the inner circumference during the rotational deployment using the roller.

19. The method of claim 10, wherein laterally deploying comprises: coupling the probe holder to a lateral slider on the pivot axis: linearly guiding the lateral slider in the lateral direction using a linear guide: linearly actuating the lateral slider along the linear guide, to laterally deploy the probe in the lateral direction; and coupling the probe holder to the lateral slider at a limiting angle of the pivoting using the angle limiter.

* * * * *

UNITED STATES PATENT AND TRADEMARK OFFICE
CERTIFICATE OF CORRECTION

| | |
|---|---|
| PATENT NO. | : 11,346,489 B2 |
| APPLICATION NO. | : 16/587752 |
| DATED | : May 31, 2022 |
| INVENTOR(S) | : Abdoulelah Al-Hannabi et al. |

It is certified that error appears in the above-identified patent and that said Letters Patent is hereby corrected as shown below:

On the Title Page

(72) there is a typographical error in the first name of the fifth inventor: "Fadi Abdellatif"
The name should read: Fadl Abdellatif Signed and Sealed this
Fifteenth Day of November, 2022

Katherine Kelly Vidal
*Director of the United States Patent and Trademark Office*